April 9, 1968
R. E. RIEBS
3,377,507
PHOTOELECTRIC LATCHING CIRCUIT FOR SIGNAL LAMPS
Filed Sept. 13, 1966
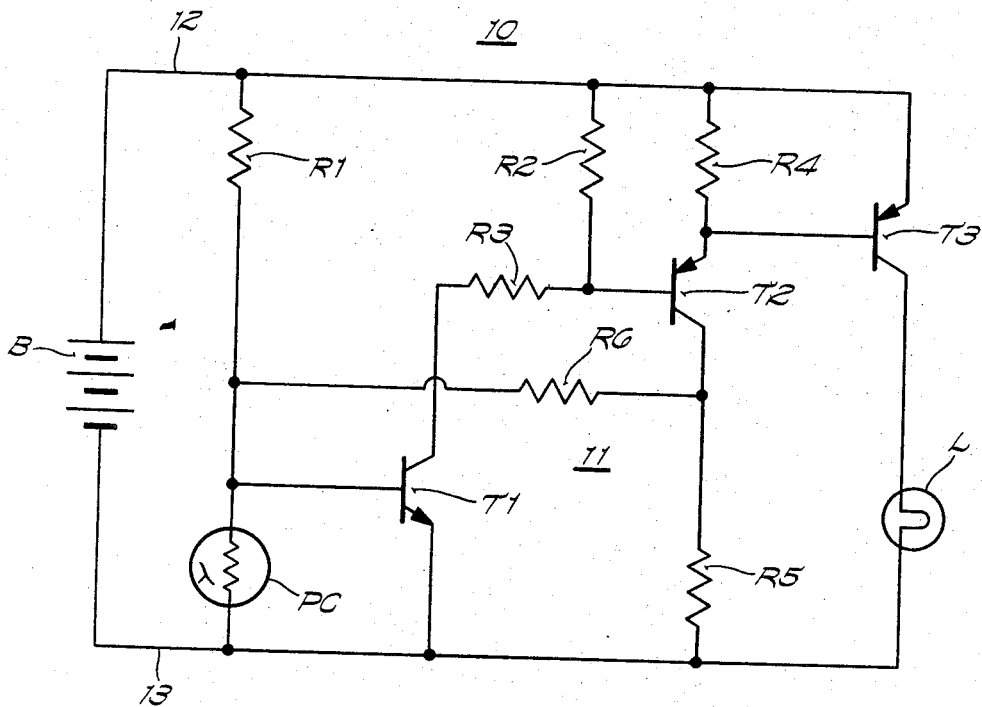
INVENTOR.
Richard E. Riebs
BY
Fred Wiviott
Attorney

United States Patent Office 3,377,507
Patented Apr. 9, 1968

3,377,507
PHOTOELECTRIC LATCHING CIRCUIT
FOR SIGNAL LAMPS
Richard E. Riebs, Hales Corners, Wis., assignor to McGraw-Edison Company, Milwaukee, Wis., a corporation of Delaware
Filed Sept. 13, 1966, Ser. No. 579,166
1 Claim. (Cl. 315—159)

ABSTRACT OF THE DISCLOSURE

A device for controlling a lamp from a self-contained DC energy source and including a negative resistance type photocell in circuit across the energy source and a plurality of transistor stages, the first stage having its base emitter circuit connected across the photocell and its collector connected to the base of a succeeding transistor stage with the last transistor being in circuit with the lamp, and a resistance connected between the base of the first stage and the collector of a succeeding stage so that the resistors are rapidly switched from their substantially off condtion to a fully on condition.

Background of the invention

This invention relates to photocontrol circuits and, more particularly, to a photocontrol circuit for a railway signal lamp.

Railway switch signal lamps are generally provided with various colored lenses and are rotatably mounted on railway switches to indicate to an approaching train the position of that switch. Initially, many such signals employed kerosene lamps, but these are now being replaced by small electric lamps which are continuously energized from a nonrechargeable dry battery.

An object of the invention is to provide a railway signal lamp which is energized only during hours of darkness.

A further object of the invention is to provide a battery energized railway switch signal lamp wherein a high percentage of battery voltage is applied directly to the lamp.

A still further object of the invention is to provide a battery energized railway signal light photo-controlled circuit which rapidly switches between its on and off states.

Brief description of the drawing

The single figure of the drawing schematically illustrates the railway signal lamp photocontrol circuit according to the instant invention.

Description of the preferred embodiment

In general terms, the invention comprises a device for controlling a lamp from a self-contained D.C. energy source including a photocell and electronic switching circuit means comprising a plurality of stages wherein each stage has control means and output means. The control means of the first stage is coupled to the photocell for receiving a predetermined signal in response to the level of ambient illumination and the output of each stage is in circuit with the control means of the next succeeding stage with the output means of the last stage in circuit to effect the energization of the lamp by said D.C. source wherein each stage is off in the absence of the control signal and each is turned on in response to the signal whereby the lamp is energized.

Referring now to the drawing in greater detail, the photo-control device, according to the instant invention, is designated by the general reference 10 and is operative to connect and disconnect a lamp L relative to a D.C. energy source symbolized by a battery B. In general terms, the photocontrol 10 includes a photocell PC for sensing the level of ambient illumination and a switching circuit 11 for connecting and disconnecting the lamp L from the battery B in response to changes in ambient illumination.

The photocell PC is connected in series with a resistor R1 and the combination is connected between the positive battery terminal 12 and the negative battery terminal 13. While the photocell PC may take any conventional well known form, in the disclosed embodiment of the invention, it is of the photosensitive negative resistance type and may be, for example, of cadmium sulfide, lead sulfide or selenium. These materials have a resistance which varies inversely with the intensity of the ambient illumination to which the photocell is exposed.

The switching circuit 11 includes a first transistor T1 and a second transistor T2 which are coupled to the photocell PC and which are constructed and arranged to initiate and terminate operation in response to changes in photocell resistance and a third transistor T3 which is constructed and arranged to complete an energizing circuit to the lamp L in response to the operation of transistors T1 and T2.

More specifically, the base of the first transistor T1 is connected to the junction between the photocell PC and the resistor R1 while its emitter is connected to the negative terminal 13. In addition, the collector of T1 is connected to the positive terminal 12 through resistors R2 and R3. The base of the second transistor T2 is connected to the junction between resistors R2 and R3 and its emitter is connected to the positive terminal 12 through resistor R4. The collector of T2 is connected through resistor R5 to the negative terminal 13 and, in addition, a feedback resistor R6 connects the collector of T2 to the base of transistor T1. The base of the third transistor T3 is connected to the emitter of transistor T2 and the emitter of T3 is connected to the positive terminal 12. The lamp L is connected between the collector of T3 and the negative battery terminal 13.

Base current for the transistor T1 will normally flow through resistor R1. However, when the level of ambient illumination is above a predetermined value, the resistance of the phtocell PC will be sufficiently small to effectively shunt this base current so that transistor T1 is nonconductive. When transistor T1 is nonconductive so that there is no current flow through resistors R2 and R3, the base of PNP transistor T2 will be at substantially the same potential as its emitter so that transistor T2 will also be nonconductive. Similarly, when transistor T2 is off so that there is no current flow through the resistor R4, the base of PNP transistor T3 will also be at substantially the same potential as its emitter so that transistor T3 will be nonconductive and the lamp L de-energized.

It can be seen from the foregoing that when the level of ambient illumination is above a predetermined level so that the lamp L is de-energized, each of the transistors T1, T2 and T3 will also be nonconductive. As a result, current drain of the battery B will be at a minimum during daylight hours.

As the level of ambient illumination falls, the resistance of the photocell PC will rise. At a predetermined minimum level of ambient illumination, the resistance of the photocell PC will reach the point where current will begin flowing through the base of the transistor T1. As a result, transistor T1 will begin operating in its transition region whereupon a small current will begin flowing through resistors R2 and R3. This makes the base of transistor T2 negative relative to its emitter so that transistor T2 also begins conducting current through resistors R4 and R5. In addition, current will flow through the feedback resistor R6 to the base of transistor T1. This feedback current substantially increases the transistor T1 base current causing it to swing into its saturation region whereby a relatively large current will flow through resistors R2 and R3. As a result, transistor T2 also begins operating in its saturation region.

The flow of current through resistor R4 also causes the base of transistor T3 to become sufficiently negative relative to its emitter so that transistor T3 begins conducting current to the lamp L. When transistor T2 begins operating in its saturation region, the base of transistor T3 will be sufficiently negative relative to its emitter so that transistor T3 will also operate in its saturation region so that the maximum current flow is now applied to the lamp L. It can be seen from the foregoing, therefore, that instead of the lamp L being turned on gradually, it goes from off to fully on as the transistors T1, T2 and T3 go substantially instantaneously from cut-off to saturation. This is possible because of the connection of the feedback resistor R6.

In addition, because resistor R5 is connected to the negative battery terminal 13 rather than in the conventional manner to the collector of transistor T3, complete saturation of the latter transistor is possible so that substantially full battery voltage is applied to the lamp L when transistor T3 is on.

Further, the fact that the feedback resistor R6 provides base current to transistor T1 once transistor T2 is turned on, the lamp L will remain energized once it is turned on regardless of small fluctuations in ambient illumination as might occur as the result of passing clouds or the like.

As the level of ambient illumination begins to rise so that the resistance of photocell PC declines, the current flowing to the base of transistor T1 will begin to decrease. At some second predetermined level of ambient illumination, the current flowing to the base of transistor T1 through resistors R1 and R6 will be insufficient to maintain operation of transistor T1 in the saturation region and current flow through resistors R2 and R3 will begin to decline. This, in turn, causes a decline in the current flowing through transistor T2 so that there is a decrease in the feedback current flowing through resistor R6. The latter current decrease is sufficient to cause the operation of transistor T1 to rapidly swing into the cutoff region whereby transistors T2 and T3 are also turned off.

It can be seen from the foregoing that the feedback resistor R6 also causes rapid operation of the switching circuit from an "on" to an "off" state. In addition, it can be seen that feedback resistor R6 assures that the device is turned off at a relatively higher level of ambient illumination than it is turned on so that the switching circuit 11 will be substantially unaffected by minor changes in the ambient illumination.

While only a single embodiment of the instant invention has been shown and described, other modifications thereof will become apparent to those skilled in the art once the invention is known. Accordingly, it is not intended that the invention be limited to the single disclosed embodiment but only by the scope of the appending claim.

I claim:
1. A device for controlling a lamp from a self-contained, direct current energy source, a negative resistance type photocell and a resistance connected in series across said energy source, a first transistor having its base connected to the junction between said photocell and said resistance, a second transistor having its base connected to the collector of said first transistor, the emitters and collectors of said first and second transistors being in circuit across said source, resistance means in circuit between the collector of said second transistor and the base of said first transistor so that said first and second transistors will go from a substantially nonconductive condition to a fully conductive condition in response to a decrease in ambient illumination to a predetermined level, a third transistor having its base connected to the emitter of said second transistor and its emitter and collector connected in series with said lamp and the series combination connected directly across said energy source.

References Cited

UNITED STATES PATENTS

| 2,828,450 | 3/1958 | Pinckaers | 307—88.5 |
| 3,139,556 | 6/1964 | Grontkowski | 315—158 |
| 3,130,349 | 4/1964 | Mallory | 315—156 X |
| 3,176,189 | 3/1965 | Tabet | 315—149 X |
| 3,069,552 | 12/1962 | Thomson | 307—88.5 |

JAMES W. LAWRENCE, *Primary Examiner.*

C. R. CAMPBELL, *Assistant Examiner.*